No. 608,902. Patented Aug. 9, 1898.
F. PEDERSEN.
TOOL HANDLE.
(Application filed July 8, 1897.)
(No Model.)
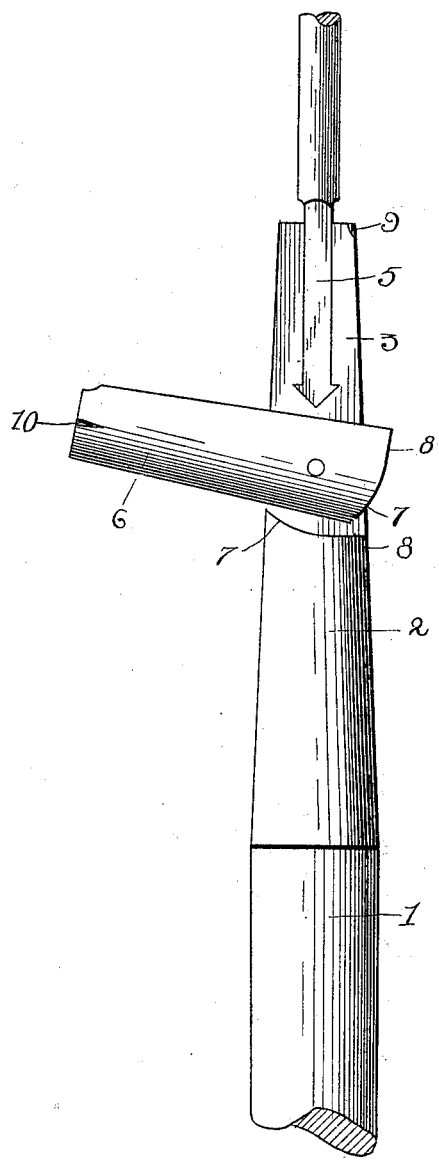
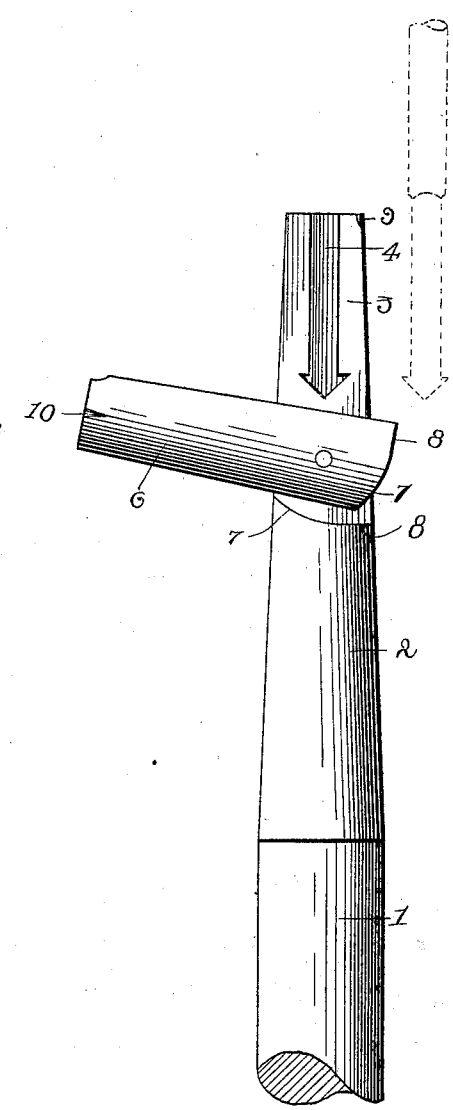
Witnesses
J. A. Brophy
Victor J. Evans
Inventor
Fred Pedersen
By John Wedderburn
Attorney

UNITED STATES PATENT OFFICE.

FRED PEDERSEN, OF CHILDRESS, TEXAS.

TOOL-HANDLE.

SPECIFICATION forming part of Letters Patent No. 608,902, dated August 9, 1898.

Application filed July 8, 1897. Serial No. 643,856. (No model.)

*To all whom it may concern:*

Be it known that I, FRED PEDERSEN, of Childress, in the county of Childress and State of Texas, have invented certain new and useful Improvements in Tool-Handles; and I do hereby declare the following to be a full, clear, and exact description of the invention, such as will enable others skilled in the art to which it appertains to make and use the same.

This invention relates to tool-handles. I have especially designed this tool-handle for hoe-handles, rake-handles, and other like farming implements.

The invention consists in the combination of a wooden shaft or handle, a metallic tool-socket coupled with the wooden part of the handle in any approved way, as by being inserted in a cylindrical or conical socket, a tool to fit in the tool-socket, and a keeper to hold the tool-shank in its socket.

In the drawings forming part of this specification, Figure 1 is a segment or part of a wooden handle with the metallic socket part connected therewith, the keeper being swung into position so that the shank of the tool may be inserted to its seat. Fig. 2 is a similar view showing the shank of a tool in position and ready to be secured in place.

1 is the wooden part of the handle and may be of any proper and suitable dimensions. 2 is the metallic part of the handle secured upon the wooden shaft in a well-known way by inserting the end of the wooden shaft into a cylindrical or conical seat. Instead of the seat being conical and embracing the wooden handle entirely, such seat may be formed by straps or ears and held to the wood by means of rivets.

The socket part where the tool is to be secured is provided with a plain surface, as shown at 3, and with a recess or seat, as shown at 4, the recess being of a shape and size corresponding with the shank 5 of a tool or implement, as a hoe. In the form in which I have shown this the shank is rectangular in cross-section and provided with a head like an arrow-head, the socket being made to correspond. 6 is a keeper which is pivoted, as shown, to the plain face 3 of the socket in such way that it may be swung out at right angles or thereabout with the socket part 2, so that the shank of a tool or implement may be either introduced or removed from its seat, and when turned into line with the handle the tool is securely coupled and held in position. The curve 7, which forms the abutment for the keeper 6, is slightly eccentric to the axis of movement of said keeper and has a straight part 8, which corresponds with a similar part on the keeper, so as to form an abutment or stop to limit the movement of the keeper in its closing position, so that it cannot pass beyond the line of the handle. As a further security and to prevent the keeper from passing the line, I provide a projection or abutment 9 at the forward end of the socket, and for convenience in operating the keeper I form a projection or nose 10 at its forward end.

In practice I propose to have two, three, or more tools or implements adapted to be interchangeably used with my improved handle. The change from one tool to another can be quickly made, and yet when the tools are in position they are as firmly held as though the handle and the tool were permanently connected together. The keeper may be made so as to draw somewhat and press the shank of the tool as it is closed, and the amount of this draw may be regulated through the pivot of such keeper, which may be and ordinarily will be a screw-bolt. I propose to use in connection with the keeper of my improved handle a friction or other stop to hold it in its closed position and prevent it from being jarred or accidentally moved on its pivot.

Having thus described the invention, what I claim, and desire to patent, is—

1. A tool-handle comprising the combination of a wooden shaft or handle part, a metallic socket part secured to the handle, the socket part being provided with a recess or seat for the tool-shank, and a pivoted keeper adapted to swing over and press the side of the tool-shank, substantially as described.

2. A tool-handle comprising the combination of a wooden shaft, a metallic socket part provided with a recess or seat for a tool-shank, a vibrating or swinging keeper for holding the tool in its seat, and shoulders or abutments to limit and regulate the extent of the closing movement, substantially as described.

In testimony whereof I have signed this specification in the presence of two subscribing witnesses.

FRED PEDERSEN.

Witnesses:
 CHAS. PETERSON,
 H. J. KING.